Oct. 28, 1941.  L. J. LOVISEK  2,261,067
METHOD OF PRODUCING SOCKET SCREW FASTENERS
Original Filed June 25, 1940   7 Sheets-Sheet 1
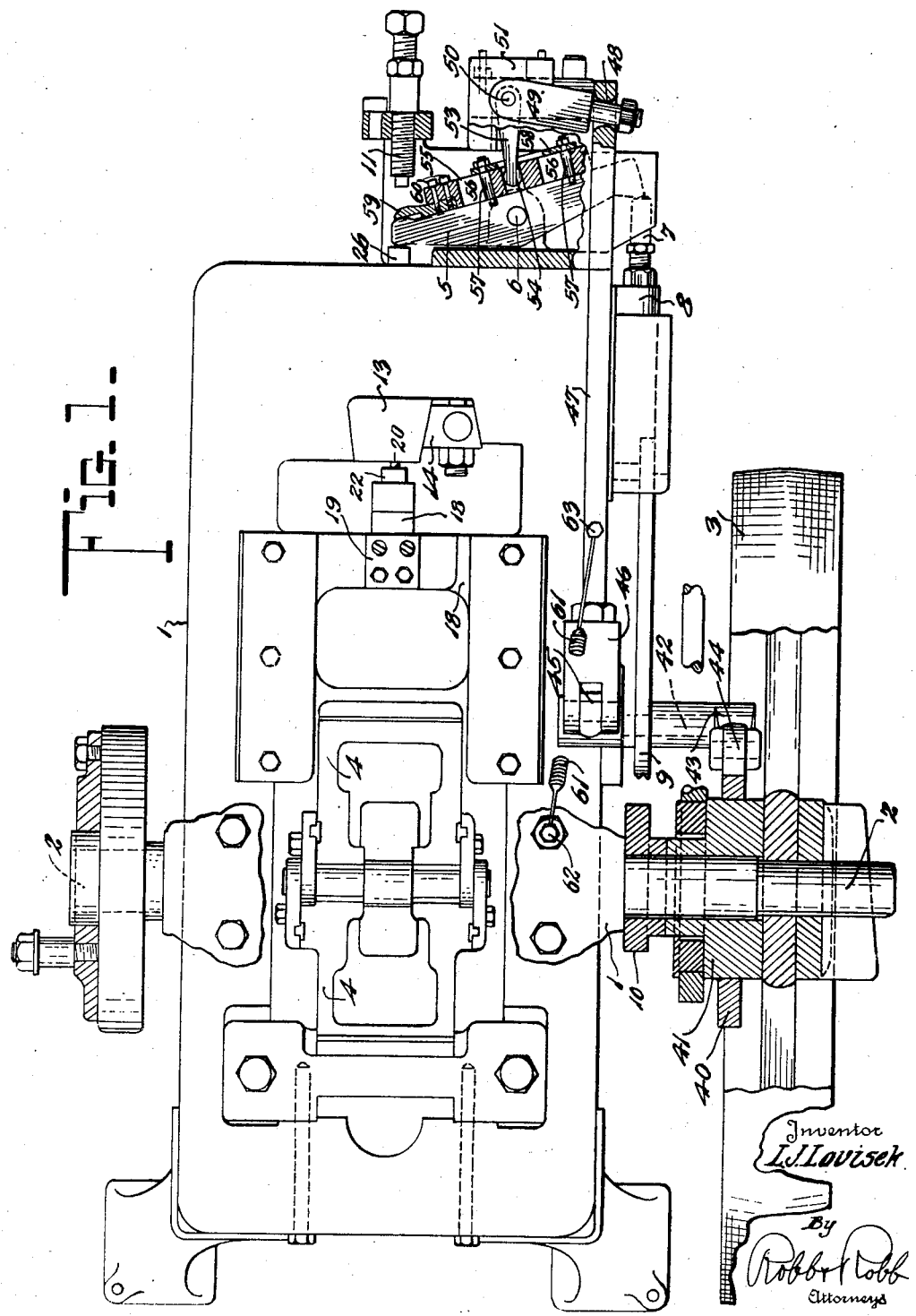

Oct. 28, 1941.  L. J. LOVISEK  2,261,067
METHOD OF PRODUCING SOCKET SCREW FASTENERS
Original Filed June 25, 1940   7 Sheets-Sheet 2
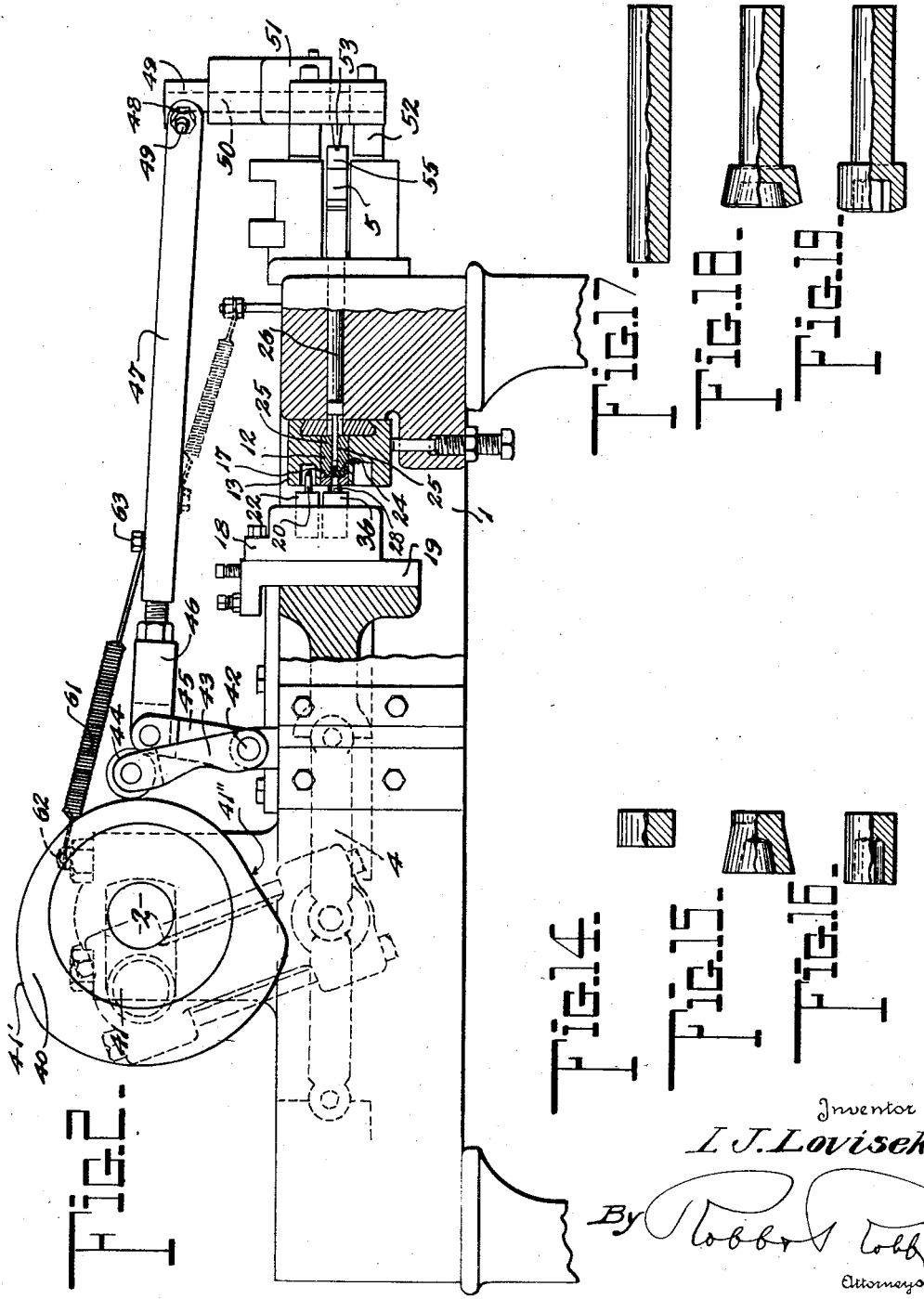
Inventor
L. J. Lovisek
By Robb & Robb
Attorneys

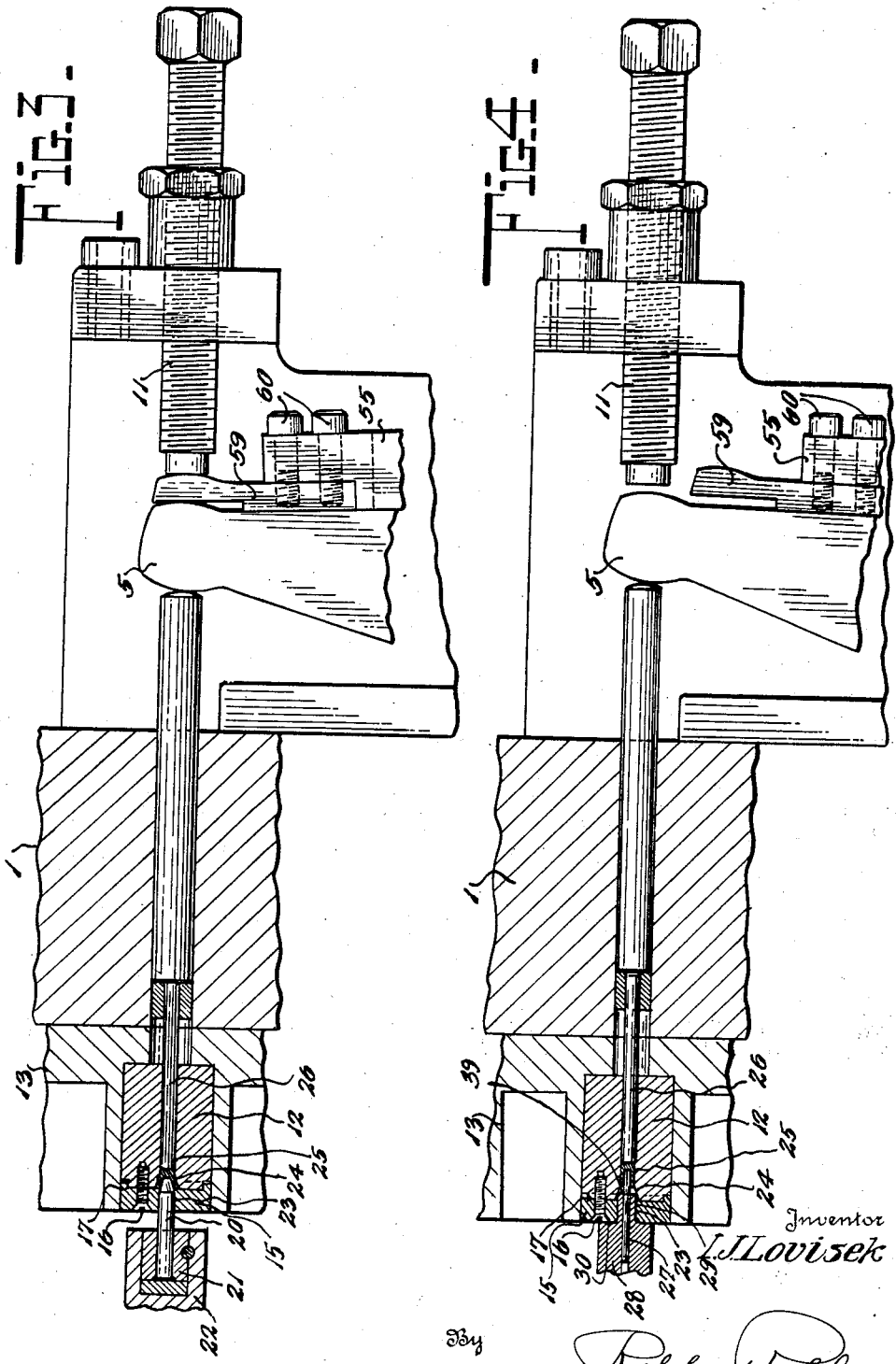
Oct. 28, 1941. L. J. LOVISEK 2,261,067
METHOD OF PRODUCING SOCKET SCREW FASTENERS
Original Filed June 25, 1940 7 Sheets-Sheet 3
Inventor
L. J. Lovisek
By Robb & Robb
Attorneys

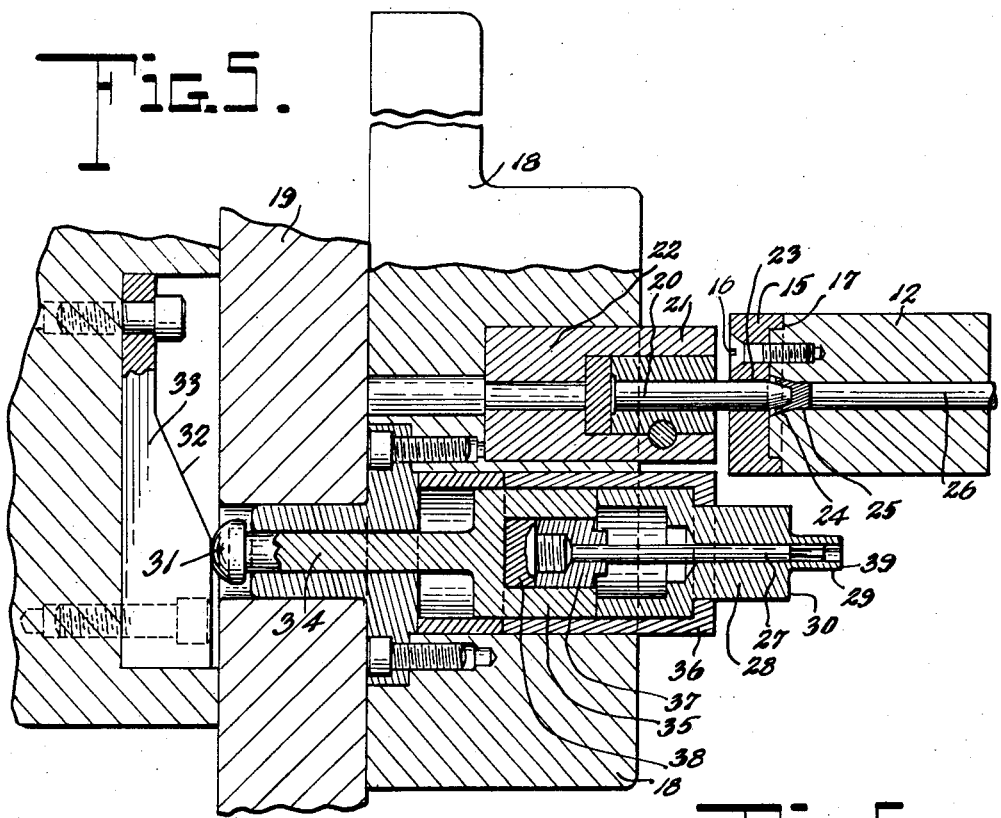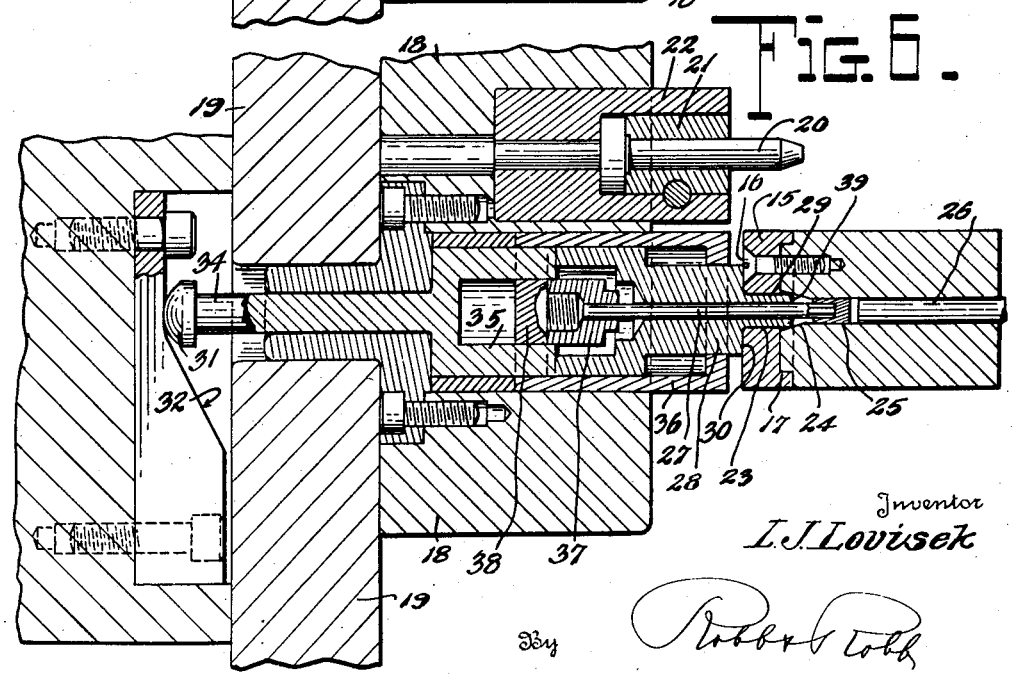

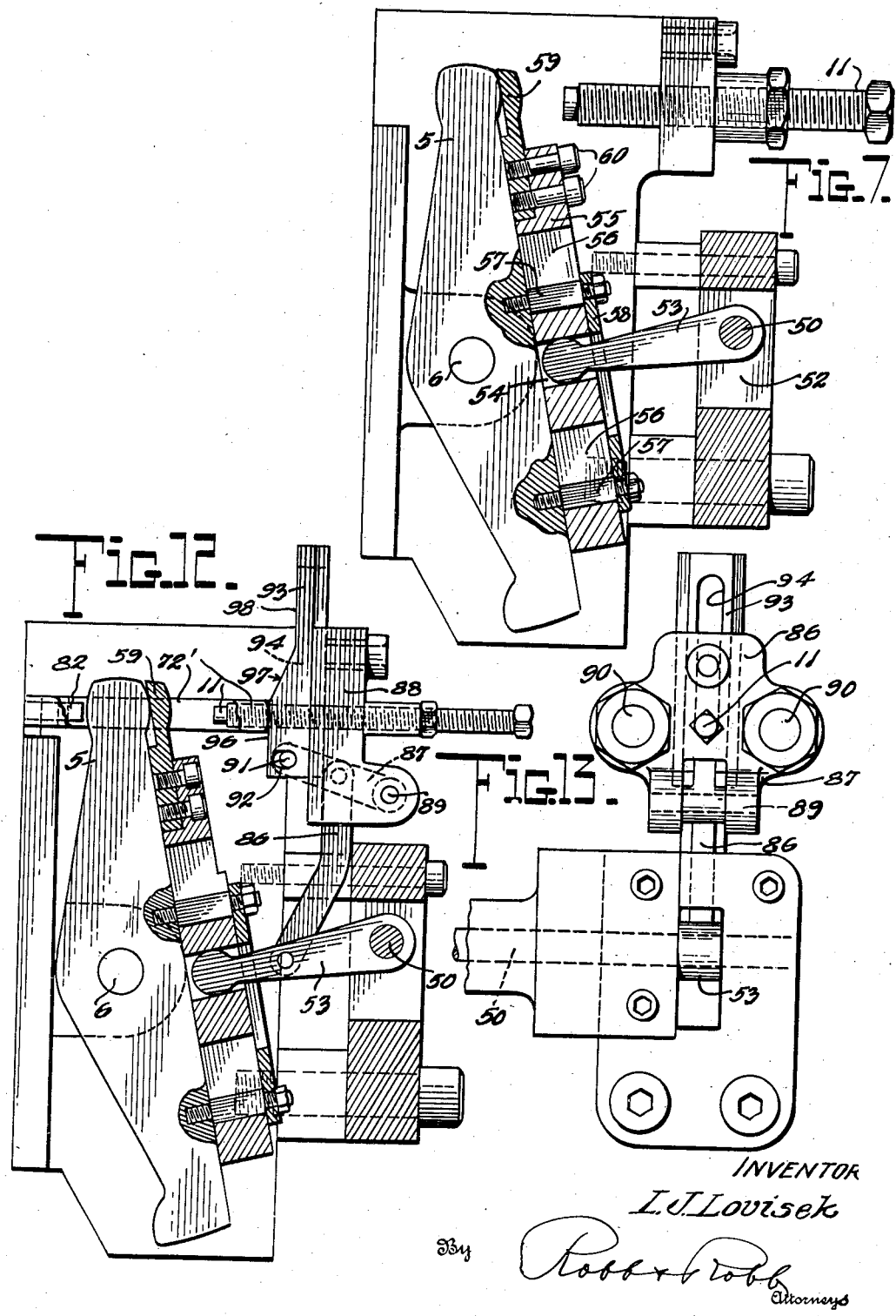

Oct. 28, 1941. L. J. LOVISEK 2,261,067
METHOD OF PRODUCING SOCKET SCREW FASTENERS
Original Filed June 25, 1940 7 Sheets-Sheet 6
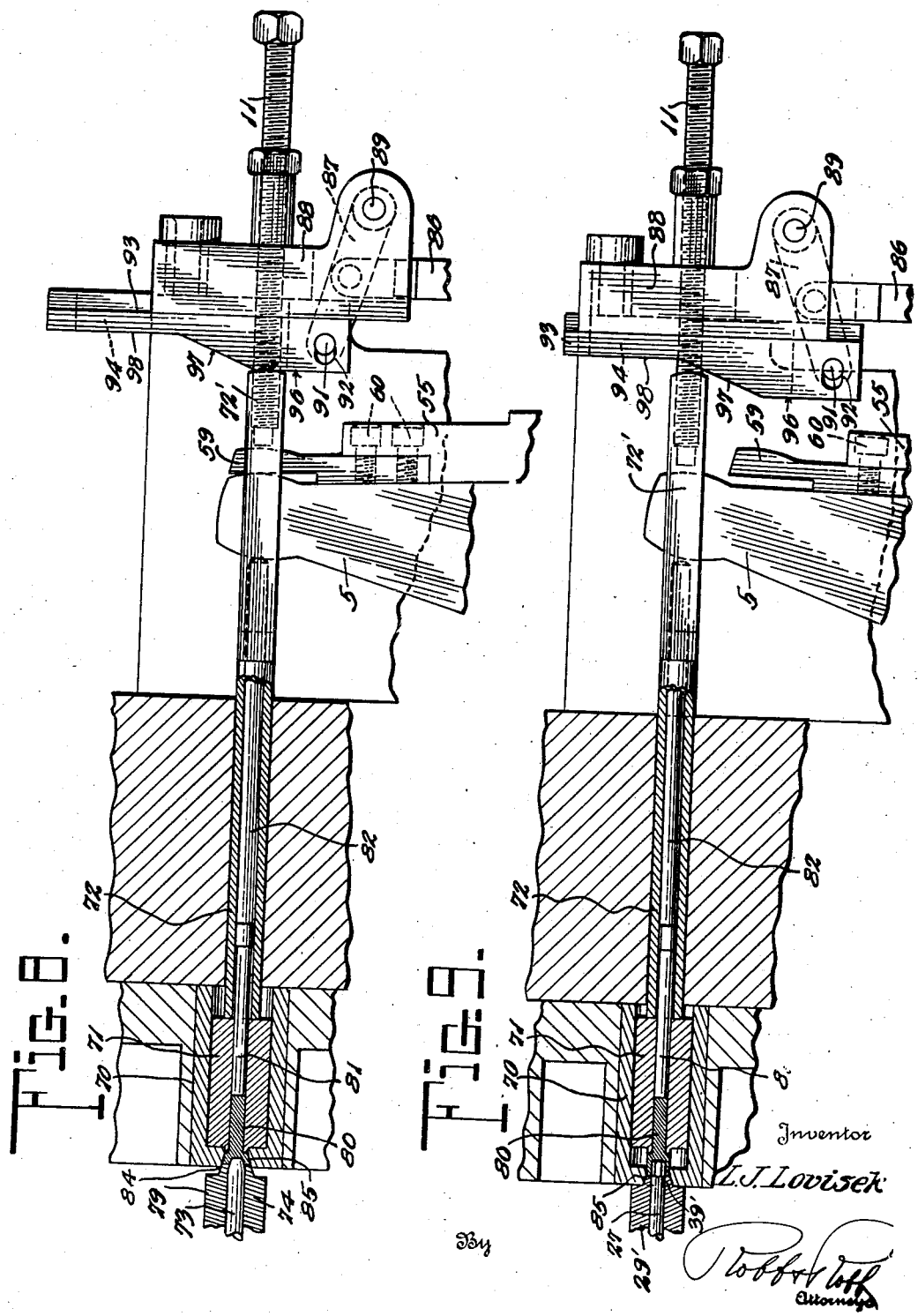
Inventor
L. J. Lovisek
By Polk & Polk
Attorneys Oct. 28, 1941.   L. J. LOVISEK   2,261,067
METHOD OF PRODUCING SOCKET SCREW FASTENERS
Original Filed June 25, 1940   7 Sheets-Sheet 7
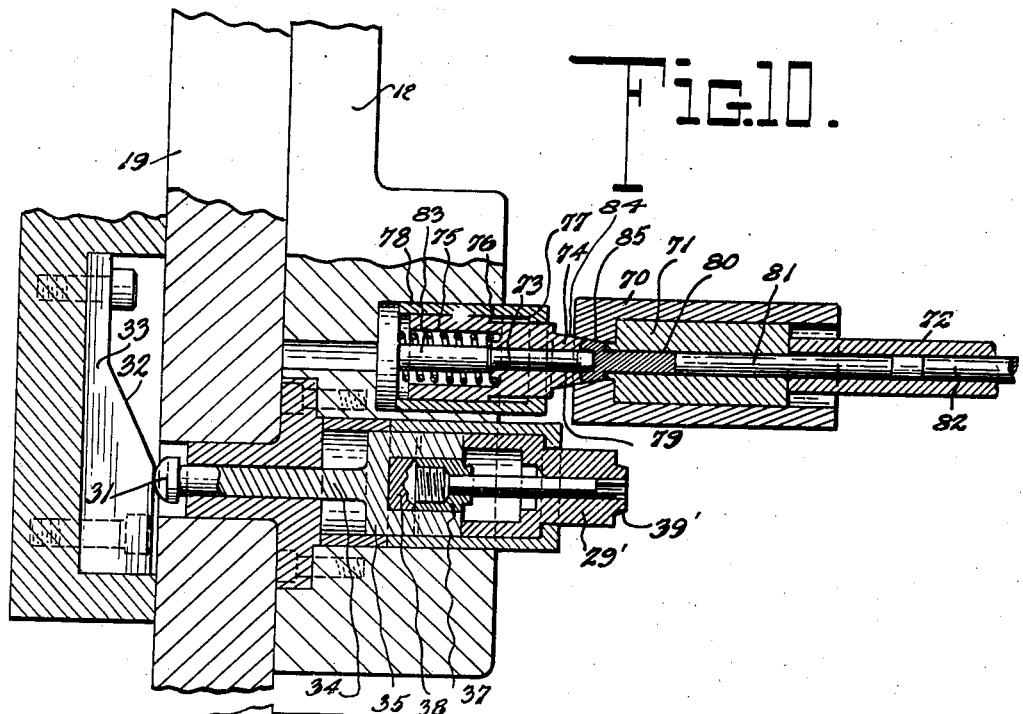
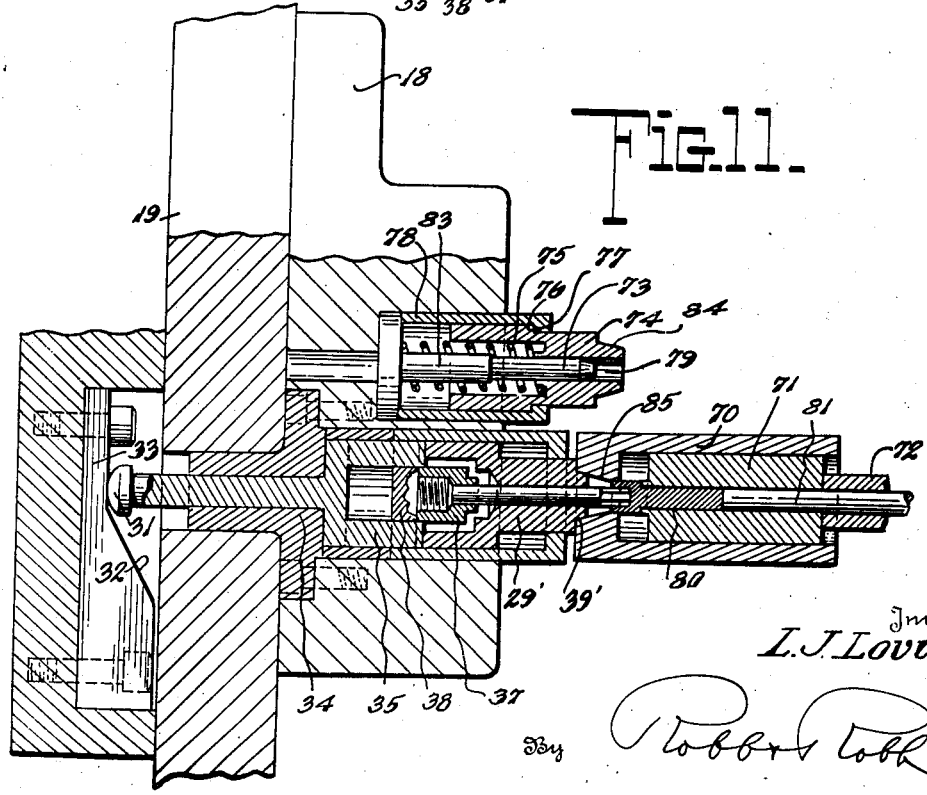
Inventor
L. J. Lovisek
By Robb & Robb
Attorneys Patented Oct. 28, 1941

2,261,067

UNITED STATES PATENT OFFICE 2,261,067

METHOD OF PRODUCING SOCKET SCREW FASTENERS

Louis J. Lovisek, New York, N. Y., assignor to Parker-Kalon Corporation, New York, N. Y., a corporation of New York Original application June 25, 1940, Serial No. 342,399. Divided and this application February 19, 1941, Serial No. 379,667

3 Claims. (Cl. 10—27)

The present invention relates to improvements in novel methods of pressure-shaping blank materials for the purpose of producing hollow articles, such as socket screws or fastener devices, enabling the operation of the said devices by means of a wrench or equivalent tool.

This application constitutes a division of my co-pending application filed June 25, 1940, Serial No. 342,399, for drop-back or supplemental backstop mechanism for heading apparatus. This application relates to mechanism applicable to conventional header apparatus, by means of which stock continuously fed from a source of supply may be formed into individual articles of varying shapes embodying hollow extremities, the formation of which conforms to shaping dies, so operated in coordination with the header instrumentalities that the stock material may be shaped to produce the article blanks complete excepting only for threading, in one and the same machine.

In order to make clear the manner in which the article blanks above referred to are shaped to produce the screw devices, it is desirable to describe fully the apparatus by means of which the method of shaping is performed, and in the present instance this apparatus takes the form of an attachment readily applicable to a well known header construction to thereby economically turn out such articles as flush head set screws, socket screws, and plugs of various types with normal or oversize heads, hexagonal nuts, ammunition shells, cap nuts and the like, and it embodies primarily supplemental back stop or drop back mechanism and actuating means therefor synchronized with the regular knockout means of the header device so as to control the die-shaping instrumentalities in a manner to first cause the end portions of the blanks to be deformed laterally or expanded to receive a shaping tool thereinto and thereafter drawn or compressed about said tool to proper external and internal size and shape for the finished article.

One of the primary objects of my invention is to provide a construction which in nowise prevents the header apparatus itself from functioning normally as a header when so desired, and, to this end, my attachment is so mounted as to be readily thrown in and out of operation by a very simple connection, depending upon the particular operation desired on articles to be produced.

Other and further objects and advantages of the invention will be hereinafter set forth and the novel features thereof defined by the appended claims.

In the accompanying drawings—

Figure 1 is a top plan of a conventional header machine having my invention applied thereto, parts being broken away and shown in section to disclose the details of construction;

Figure 2 is a side elevation of the apparatus, the flywheel being removed and parts being broken away and shown in section;

Figure 3 is an enlarged detail view showing the position of the spacer element of my dropback mechanism during the preliminary die-shaping step of a socket set screw or the like;

Figure 4 is an enlarged view showing the spacer device of my invention displaced into inoperative position, as during the finishing step for the set screw blank;

Figure 5 is an enlarged view, partly in elevation and partly in section, showing the position of the preliminary punch at the completion of its forward stroke;

Figure 6 is a corresponding view showing the position of the second punch at the end of its stroke;

Figure 7 is an enlarged plan view, parts being broken away and shown in section, and illustrating more specifically the spacer slide in its position during the preliminary step of treatment of screw blanks;

Figure 8 is a plan view showing the first position of a modified form of drop-back mechanism used in producing socket head cap screws;

Figure 9 is a view similar to Figure 8 and showing the position of the parts thereof in the second forming step of a cap screw blank;

Figure 10 is a view in elevation, parts being broken away and shown in section, depicting the position of the preliminary punch in the first step of forming a cap screw blank;

Figure 11 is a similar view showing the position of the finishing punch in the second step of forming the cap screw blank;

Figure 12 is an enlarged detail view of the end of the header machine showing the operative position of my modified form of drop-back mechanism, parts being broken away and shown in section to disclose more clearly the details thereof;

Figure 13 is an end view of the structure shown in Figure 12;

Figures 14, 15 and 16 are detailed views showing the blank for producing set screws in the three stages of their production; and Figures 17, 18 and 19 are corresponding views of the three stages of production of a socket head cap screw.

Like reference characters designate corresponding parts in the several figures of the drawings.

In carrying out my invention, I have illustrated its application to a conventional header apparatus, known commercially as a solid die, double stroke toggle header, and therefore, only those general features of this apparatus have been shown which will assist in a ready understanding of the present invention. Reference may be had to prior Patents 2,090,641 and 2,160,087 for further details or information relative to the commercial structure.

To this end, referring to Figure 1, 1 designates the frame of the header on which is mounted the crank shaft 2 carrying the flywheel 3. The toggle mechanism is generally indicated by the numeral 4, and at one end of the machine is located the knock-out lever 5 swivelled on pin 6 and operated by the adjusting screw 7, slide 8, and connection 9 to eccentric cam 10. The lever 5 is limited in movement in one direction by this cam and in the other direction by the backing screw 11.

It will be understood that wire stock is intermittently fed to the header mechanism in the customary manner and by a cut-off knife the desired length of stock is cut off and carried into position directly in front of the heading die. This cut-off assembly is not herein shown as it forms no part of this invention, and, furthermore, is conventional. The operation of the header in the treatment of this blank, however, will now be taken up rather specifically in conjunction with the novel features of my attachments.

Assuming first that the individual blank presented to the matrix or heading die as aforesaid is to be made into a hollow or socket set screw of the flush type, without head, said blank is first subjected to an expanding action to receive a socket-forming tool, and thereafter drawn into final shape by a finishing die.

To accomplish these steps upon the header apparatus disclosed herein, it will be noted by reference to Figures 1 and 3 that the heading-die 12 is mounted in the usual die block 13 held stationary in the frame of the machine by the wedge 14. The die 12 is provided with a guide bushing 15 held in place by screws 16 and centralized on it by shoulder 17.

Passing now to the punch block assembly, in the block 18 carried by the vertically movable slide 19 are mounted the preliminary and finishing punches or pins, the former, designated 20, being solidly held in the bushing 21 of the holder 22. Assuming that the slide block is in its lower position (Figure 5), the punch 20 under the action of the toggle mechanism pushes the blank into and through the opening 23 of the bushing 15 and into the tapered mouth 24 of the heading-die 12. As the punch and blank continue to move forwardly, the forward end of the blank is pushed into the longitudinal bore 25 of reduced diameter. The blank continues to move forwardly until it hits the knock-out or stop pin 26 of the knock-out mechanism. It might be noted at this point that the pin 26 is held in the position shown in Figure 3 by the knock-out lever 5 hereinbefore mentioned and the backstop means. As the toggle mechanism continues to move the punch forward, the cut-off blank is caused to spread out or expand in conformity with the tapered extremity of the punch and the tapered form of the matrix die, as clearly shown in Figure 3 of the drawings. The punch, having now completed its stroke, recedes under the action of the toggle mechanism, leaving the blank in the heading-die 12. Should the blank tend to adhere to the end of the punch, it will be automatically displaced therefrom by contact of the flared extremity of the blank with the shoulder or face of the bushing 15 which overhangs the tapered entrance 24 of the heading-die. As the first or preliminary punch 20 further recedes, the punch block 18 rises under the influence of the conventional slide shifting means of the header apparatus until the finishing punch 27 lies directly opposite the heading-die 12 and the treated blank now positioned therein.

It is to be understood at this point that in the first or preliminary forming step of the article as above described, the supplemental back-stop mechanism which forms the subject-matter of my invention and which will later be fully described, functioned in backing up the knock-out pin 26 by virtue of the cooperation of a slide member which is mounted upon the knock-out lever 5 so as to interpose a spacer element between the end of this lever and the backing screw 11. The position of the parts, including this slide element in the first step of the forming operation as before described, is clearly seen in Figure 3 of the drawings.

However, before specifically referring to said supplemental back-stop means, the second or finishing step of the die will be set forth. Referring to Figures 4 and 6, it will be noted that the finishing punch 27 is mounted in a sleeve 28, and that this sleeve at its forward end is formed with a reduced extension 29 which, upon the next forward movement of the punch block assembly, enters the guide opening 23 in the bushing 15 of the matrix or heading-die. This forward assembly movement continues until the shoulder 30 on the sleeve 28 comes into contact with the face of the bushing 15. This forward motion of the sleeve 28 is thus stopped, but the finishing or hex punch 27 continues its forward motion until it enters the prepared recess in the flared end of the blank. When the end of the punch hits the bottom of this recess, then the blank starts to move forward, said forward motion being allowed due to the drop-back of knock-out pin 26, in turn permitted by the displacement of the slide on the knock-out lever 5. Under this condition, the knock-out lever is permitted to shift towards the backing screw 11. The forward movement of the knock-out pin 26 now being stopped, the hex punch pushes the blank farther into the heading-die and the reduced extension 29 thereof compresses the metal of the blank around the hex punch. The forward motion above mentioned continues until the blank has traveled past the tapered entrance 24 of the die and is formed to the diameter of the die bore 25. The pressure shaping of the blank or finishing step is now completed, and thereafter the entire assembly of the second heading or finishing punch recedes.

If the blank remains in the die, the normal action of the knock-out mechanism of the header machine causes the knock-out pin 26 to travel in the reverse direction so as to push the blank through the opening 23 of the bushing 15 and allows it to drop out of the machine by gravity. It might be noted that the blank in this movement will pass freely through the guide bushing, as stated, due to the fact that the diameter of the blank is now smaller than said opening.

However, if the blank should adhere to the hex punch 27 as it recedes, another mechanism for stripping it from the punch comes into play. In other words, as the punch block 18 shifts to put the preliminary punch back into the initial position herein described, the button 31 is caused to ride across the face 32 of the stationary cam 33 associated with the punch assembly slide. This causes the button, its connecting shank 34, and yoke 35 to move in the forward direction, thereby pushing the sleeve 28 to the right in its bushing 36. It will be observed in Figure 5 that the punch 27 is solidly held in position by the nut 37 onto the bridge 38 which is fastened to the punch block 18. Since the punch 27 is standing still relatively speaking, the face 39 of the extension 29 pushes against the end of the blank, thereby stripping it from the punch and allowing it to fall out of the machine by gravity.

Passing now to a specific description of the supplemental back-stop mechanism of my invention, and referring to Figures 1 and 2 of the drawings, it will be noted that I mount a cam 40 upon the collar 41 of the flywheel 3, this cam having a rising portion 41' and a dwell 41''. Mounted upon the frame of the machine adjacent this cam is a horizontal shaft 42, to one end of which is connected the upstanding arm 43 carrying the follower roll 44 which is arranged to bear against the face of the cam 40. At the opposite end of the shaft 42 is fixed a second arm 45, to the upper end of which is secured the adjustable clevis 46 in turn connected to the rod 47, having at its outer extremity a suitable opening 48 to receive the end of the short lever 49. This last-named lever in turn is connected to the vertical shaft 50 which rotates in the bearings 51 and 52. To the lower end of the shaft 50 is connected the lever arm 53, having its outer rounded extremity fitted into a slot 54 of the slide bar 55. This sliding bar has a pair of rectangular slots 56 which permit the bar to slide on squared pins 57 which are screwed into the edge of the knock-out lever 5. A retainer plate 58 is employed to keep the sliding bar in contact with the knock-out lever. To one extremity of the sliding bar 55 is detachably connected, as by means of fastening screws 60, the spacer element or tip 59 having one face thereof rounded. The end of this spacer element is of a thickness determined by the distance which the knock-out pin 26 is to drop back after the preliminary step of pressure shaping the blank.

The cam roller 44 is held in contact with the cam 40 by means of the spring 61, which is connected at one end to the frame of the machine, as at 62, and at its other end to the rod 47, as at 63. In operation, the rising portion 41' of the cam 40 causes the arm 43 to move clockwise which in turn shifts the rod 47 longitudinally to the right. This causes the lever arm 49 to shift counterclockwise and the lever arm 53 to move in a similar direction, thus imparting retracting movement to the slide bar 55 so as to allow the end of the knock-out lever to move its full stroke into contact with the backing screw 11. As the cam 40 continues to rotate, the cam roller 44 passes into the dwell 41'' which effects a reverse movement of the slide bar 55, thereby causing the spacer tip 59 to shift to a position in which it is interposed between the end of the knock-out lever 5 and the backing screw 11. This position is the normal position of my supplemental back-stop mechanism, and is also the position assumed by the parts in the preliminary step of forming the blank as above described for producing articles as hollow set screws.

When the machine is to be operated for the purpose of shaping a socket cap screw of the headed type, the mechanism of my supplemental back-stop attachment is slightly modified, as will now be more fully set forth in connection with the disclosure shown in Figures 8 to 13 of the drawings. In this case, as before described, a suitable length of wire stock is cut off and the blank carried by the cut-off mechanism into a position in alinement with the heading-die 70. This die has mounted therein as a part thereof a shiftable sleeve 71 which, although free to move longitudinally in the die, is held in place at this cycle of operation by means of the sleeve 72 forming a part of my modified supplemental back-stop mechanism. As the first punch 73 is ready to come forward to do its work, the sleeve 74 in which it is mounted is in an extended position, as shown in Figure 11 of the drawings. Said sleeve 74 is held outwardly by a suitable expansion spring 75, and the outward movement of the sleeve is stopped by the shoulder 76 thereof abutting the shoulder 77 of the guide bushing 78. This bushing is fixedly held in the punch block. As the first punch assembly advances, the cut-off blank (see Figure 17) enters the opening 79 in the sleeve 74, and the forward assembly movement continues until the end of the punch 73 touches the end of said blank. Thereupon, further movement of the assembly causes the blank to be pushed into the opening 80 of the die sleeve 71 until the blank contacts the knock-out pin 81, which is held stationary so as to constitute an abutment by the knock-out rod 82 which, in turn, is held stationary by the knock-out lever 5, and supplemental back-stop mechanism slide 55 in the position thereof in which the spacer tip is interposed between the knock-out lever 5 and the backing screw 11.

Since the forward movement of the punch 73 is continued by the pressure of its backing pin 83, the blank begins to upset. At this point, the taper 84 of the punch sleeve 74 enters into the tapered opening 85 of the heading-die 70, thus holding the punch sleeve 74 and the punch 73 in direct alinement with the bore 80 of the die sleeve 71. The forward movement of the sleeve 74 is thus stopped. As the forward movement of the punch block 18 continues, the bushing 78 slides over the then stationary sleeve 74, and the punch 73 slides through the opening 79 thereof. This movement continues until the blank is formed, as shown in Figure 10. As the punch block 18 now recedes, the blank is held in the die by friction developed in the bore 80 between the die sleeve 71 and the blank. As the first punch assembly recedes still farther, the punch block 18 rises, as heretofore described, in order to bring the finishing punch into operative position with respect to the blank. It may be stated at this point that the operation of the finishing punch in connection with this modified form of the invention occurs in exact accord with the operation of the finishing punch as described with reference to the finishing step above described in connection with the hollow set screw article blank. It, therefore, is unnecessary to again set forth in detail said operation in connection with the shaping of the socket cap screw article blank. It is sufficient to say, however, in connection with the finishing punch assembly of this modified form that the finishing punch sleeve, as shown in Figure 11 of the drawings, and designated in said figure 29', is slightly differently shaped as regards the forward extension 39' thereof. As will be noted in the figure last referred to, this extension has a tapered form, the taper conforming to the taper of the entrance 85 of the heading-die 70.

It is also desirable to note that in this second step of finish shaping of the cap screw, the die sleeve 71, during the preliminary step of expanding the head end of the blank, is at its extreme position in the die 70, as shown in Figure 10, being held in such position by the sleeve 72 as hereinbefore explained.

When the shift is made to bring the finishing punch in this instance into position to cooperate with the heading-die, it is necessary that the sleeve 71 be permitted to move from the said extreme position above referred to away from the constricted portion of the entrance 85 of said die so as to occupy a position as clearly shown in Figure 11 of the drawings. This will permit the finishing punch to shift the blank from the position shown in Figure 10 through the constricted portion of the entrance 85 to draw the head of the blank about the hexagonal terminal of the finishing punch into its final shape forming the hexagonal socket. This is accomplished by operation of certain cam and backing means which will now be described more in detail.

Referring to Figures 8 and 12 of the drawings showing the position of the parts of the knockout mechanism and supplemental back-stop means at the conclusion of the preliminary shaping step, it will be noted that the slide shifting lever arm 53 in this form of the device has connected thereto an arcuately shaped link 86, and said link at one of its ends is pivotally connected to the arm 87 mounted in the bracket 88 on the pivot 89, said bracket being suitably attached to the frame of the machine by the clamping bolts 90. The opposite end of the arm 87 is provided with a pin 91 which extends into an elongated slot 92 in a slide cam 93. This cam, as shown in Figure 13 of the drawings, is slotted at 94 to accommodate the stop screw 11 in its travel to and from the position shown in Figure 8 of the drawings. The face 96 of this cam slide coacts with the bifurcated end 72' of the sleeve 72 so as to hold the sleeve in the preliminary shaping step in the position above referred to and shown in Figure 8 of the drawings. It will be observed in Figure 12 that the bifurcation of the sleeve end, as at 72', permits the end of the knock-out lever 5 and the spacer tip 59 to extend therethrough. The surface of the slide 93 inclines from the face 96, as indicated at 97, to the second surface 98, and, therefore, when the slide 55 moves away from the position shown in Figure 12, under the actuation of the lever arm 53, the cam member 93 through the link connection 86 and actuating arm 87 will also correspondingly shift from the position shown in Figure 8 to the inoperative position as regards this cam clearly depicted in Figure 9 of the drawings. Under such conditions, the die sleeve 72 backs off and allows the heading-die sleeve to move back, and the finishing punch as before stated, under the action of the toggle mechanism, pushes the cap screw blank through the die opening to draw the head of the blank into its final or finished shape.

When the finishing punch assembly recedes as just stated, if the formed blank remains in the die, the normal operation of the knock-out mechanism of the conventional heading machine causes the knock-out pin to push said blank through the opening in the heading-die, thus allowing the blank to drop out of the machine by gravity.

However, if the blank should adhere to the finishing punch and should recede with it, another mechanism or stripping means comes into operation. As the punch block 18 shifts to put the preliminary punch 20 again into the position hereinbefore described, the button 31 rides across the face 32 of the stationary cam 33 to initiate the operation of the stripping means in the manner hereinbefore described with reference to the stripping phase of the device in connection with the forming of the set screw. It is unnecessary to repeat again the operation of this mechanism at this point under the conditions.

By way of summary of the sequence of operations incident to the pressure shaping of these blank units, the various steps are as follows:

(1) The wire stock is cut off to the proper length desired for forming the particular blank.

(2) The blank is transferred by the cut-off mechanism into position in front of the heading-die.

(3) The first heading punch pushes the blank into the die, performs its particular shaping operation of expanding the end of the blank and forming a tool recess, then recedes and rises to permit the second punch to come into operative position.

(4) The supplemental back-stop or drop-back mechanism forming the special subject matter of this invention shifts out of backing position to permit backing off of the knock-out pin, allowing the knock-out lever of the conventional header machine to coact with the backing screw of the header machine.

(5) The second or finishing punch performs its operation on the blank to finally shape the latter and then recedes and shifts downwardly to again bring the first or preliminary punch into its operative position.

(6) The blank is either stripped off of the punch or ejected from the die by a knock-out pin.

(7) The supplemental back-stop or drop-back mechanism causes the spacer element to again return to its initial position interposed between the end of the knock-out lever and the backing screw, thus normalizing all of the mechanism.

In conclusion, it is important to note that my attachment device does not in any way interfere with the normal operation of the header machine or the knock-out mechanism thereof. In this connection, it may be pointed out that by merely shifting the spring 61 from the position shown in full lines in Figure 2 of the drawings to that shown in dotted lines in Figure 2 of the drawings, the cam lever 43 will be held away from its actuating cam 40 and the spacer tip 59 will be held in an inoperative position, allowing the knock-out lever 5 to contact with the backing screw 11. This permits the machine to operate as a standard heading machine.

Additionally, my attachment invention may be applied upon any press or heading machine including crank and toggle headers, single or multiple blow machines, and also upon machines having one or more knock-out arrangements within the purview of my invention.

While I have described a specific form of stripping means for use in conjunction with my mechanism and a specific type of operating instrumentalities for shifting the spacer element of my attachment to and from operative position, it is to be understood that these mechanisms may readily be changed or modified to accomplish the functions and the cycles of operation to occur without departing from the spirit of the invention and within the scope of the claims appended hereto.

What I claim as new and desire to secure by Letters Patent is:

1. The method of forming socketed articles which comprises the steps of partially forcing a blank of metal into a die bore having a tapered die opening and a blank abutment spaced at a predetermined distance from said opening to expand the blank and simultaneously form a tool-receiving recess therein, then displacing the blank abutment in said bore and compressing the expanded metal upon a socket shaping tool while moving the expanded portion of the blank by said tool into the restricted portion of the said die opening to finish-shape the exterior of the blank.

2. The method of forming socketed articles which comprises the steps of partially forcing a blank of metal into a die bore having a tapered die opening and a blank abutment spaced at a predetermined distance from said opening to expand the blank and simultaneously form a tool-receiving recess therein, then displacing the blank abutment in said bore and compressing the expanded metal upon a socket shaping tool while moving the expanded portion of the blank by said tool into the restricted portion of the die opening to finish-shape the exterior of the blank and reversely moving the shaped blank out of the die opening by said blank abutment.

3. The method of forming socketed articles which comprises the steps of forcing a blank of metal into a die provided with a bore passage of a shape corresponding to the finished shape of the article and an entrance tapering portion leading to said passage to expand the end of the blank to conform the metal to the shape of the tapered entrance portion of the passage and form a tool-receiving recess therein, introducing a socket-shaping tool into said recess and forcing the expanded end of the blank by said tool into the bore passage of the said die to draw said blank end to the cross section contour of the said passage and shape the socket recess to the tool.

LOUIS J. LOVISEK.